United States Patent [19]
Näff et al.

[11] Patent Number: 5,669,633
[45] Date of Patent: Sep. 23, 1997

[54] COLLAPSIBLE MOTOR VEHICLE STEERING SHAFT

[75] Inventors: Dominik Näff, Triesen, Liechtenstein; Hubert Breuss, Gisingen, Austria

[73] Assignee: Etablissement Supervis, Vaduz, Liechtenstein

[21] Appl. No.: 592,984

[22] Filed: Jan. 29, 1996

[30] Foreign Application Priority Data

Feb. 1, 1995 [DE] Germany ............... 195 03 124.5

[51] Int. Cl.⁶ .................................................. B62D 1/19
[52] U.S. Cl. ............................ 280/777; 188/376; 74/492
[58] Field of Search ........................... 280/777, 775; 188/376, 371, 375; 74/492, 493

[56] References Cited

U.S. PATENT DOCUMENTS

| | | | |
|---|---|---|---|
| 3,487,710 | 1/1970 | Fergle | 188/371 |
| 3,504,567 | 4/1970 | Ohashi et al. | 74/492 |

FOREIGN PATENT DOCUMENTS

| | | | |
|---|---|---|---|
| 3-10965 | 1/1991 | Japan | 280/777 |
| 1390889 | 4/1975 | United Kingdom | 188/375 |
| 2247652 | 3/1992 | United Kingdom | 280/777 |

*Primary Examiner*—Kevin Hurley
*Assistant Examiner*—Peter C. English
*Attorney, Agent, or Firm*—Anderson Kill & Olick P.C.

[57] ABSTRACT

A steering shaft for a steering system of a motor vehicle including an outer tubular member, and an inner tubular member extending into the outer member and secured therein against axial and/or radial displacement relative to the outer member, with the two tubular members being axially displaceable relative to each other in case of a collision, and with one of the tubular members having tear-off strips with bent-over front ends having bent-over sections engaging the other tubular member, each of the tear-off strips being formed by two spaced flutes of the one tubular member, the flutes also defining weakness locations.

3 Claims, 2 Drawing Sheets

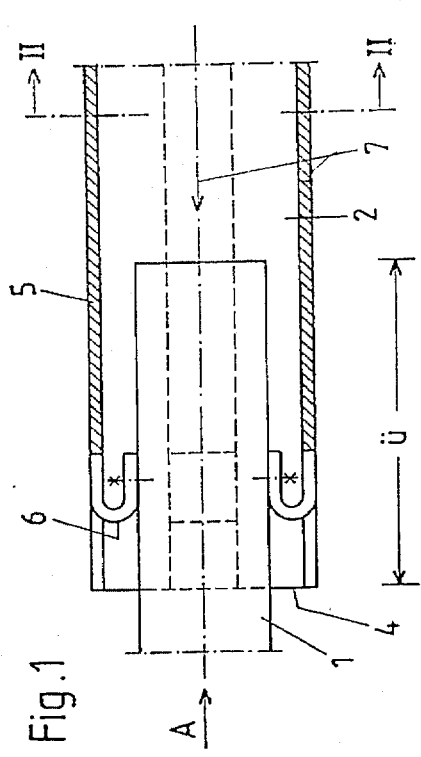
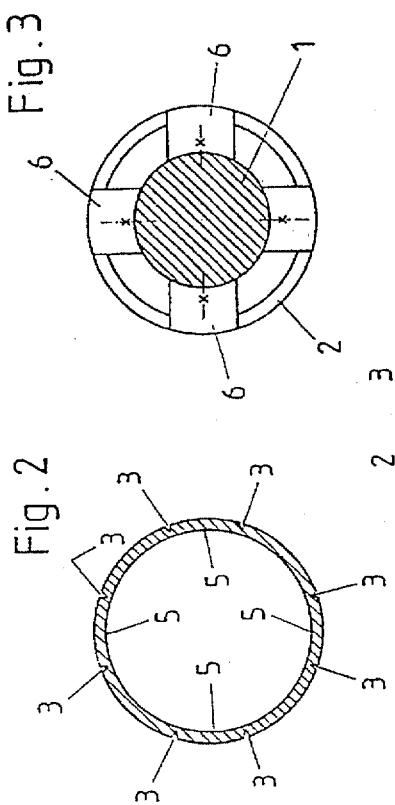
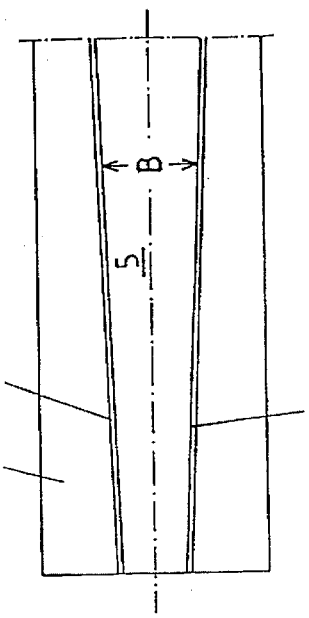
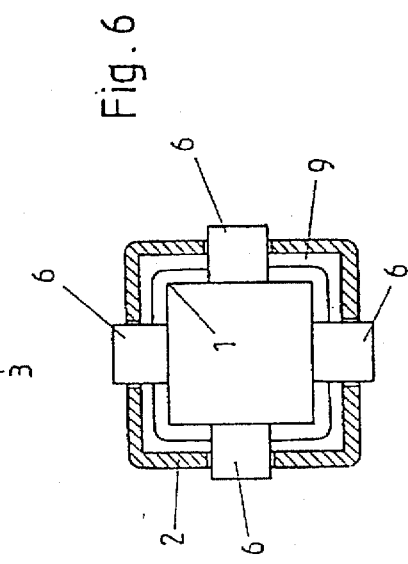
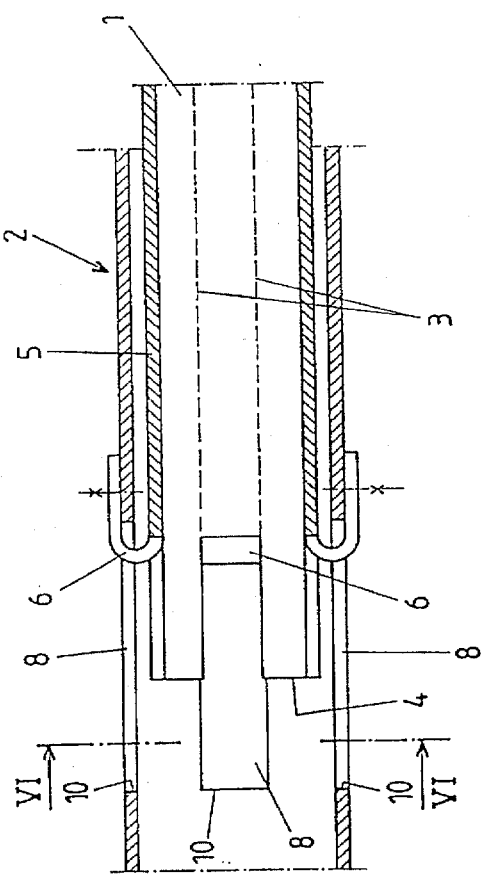

COLLAPSIBLE MOTOR VEHICLE STEERING SHAFT

BACKGROUND OF THE INVENTION

The present invention relates to a steering shaft for a steering system of a motor vehicle including an outer tubular member, and an inner member extending into the outer member and secured therein against axial and/or radial displacement relative to the outer member, with the two members being axially displaceable relative to each other in case of a collision, and with one of the tubular members, having a tear-off strip with a bent-over front end having a bent-over section engaging the other member. As known, steering shafts of steering systems of motor vehicles are often formed of two parts. Thereby, it is insured that in case of a collision, the steering column would not present a danger for the driver.

The costs of manufacturing of steering shafts should be low, and simple and inexpensive parts should be used for the steering shafts. Machining of the steering shafts parts should also be avoided as much as possible to keep the manufacturing costs low. The steering shafts, despite their two-part construction, should not have any play in the rotational direction of the steering shaft. At the same time, the steering shaft construction should provide for axial displacement of the parts relative to each other when an predetermined force acts in the axial direction as a result of a collision.

Two types of steering shafts for steering systems of motor vehicle are known. In one type of steering shafts, the impact force is converted into a deformation force. In the other type of steering shafts, the impact force is converted into a friction force and, thereby, into heat. The second type of steering shafts is disclosed in German publications Nos. 2,957,713; 2,947,395; 2,911,021; 2,431,883; 1,630,376; 2,531,263; 2,247,850; 2,232,836; 2,108,913; 2,020,390; 3,223,004; 141,115 and British Patent No. 1,524,871.

In this connection, here first, the steering shafts, which belong to the first type, should be mentioned. The first type of steering shafts is disclosed in German publication DE-OS 4017995, British Patent 1,156,423 and U.S. Pat. No. 3,504,567.

The German publication DE-OS 4017995 shows and describes a steering column tube which provides, in case of a collision, for absorption of the energy of the impact force. The steering column tube includes an energy absorber between a first end of the first part of the steering column tube and a second end of the second part of the steering column tube. The energy absorber has, on a portion of its inner element, an adjustable section having a bulge engaging the outer element of the strip-formed absorber. When, in case of a collision, an impact force is applied to the first or second part of the steering column tube, further bulging takes place, whereby the amount of the absorbed energy is maximized due to limited load and displacement. As has already been mentioned, the energy absorber is formed of strips. It is formed as a separate unit and is welded to the steering column tube. Similar constructions are disclosed in U.S. Pat. No. 3,504,567, in which the strip-shaped absorber is located in grooves of a steering column tube. In a similar absorber disclosed in British patent No. 1,156,423, the strip-shaped absorber forms a section of a steering column tube.

These strip-shaped absorbers, in case of a front collision, when increased impact forces are generated, are easily deformed, so that a very small portion of the generated energy can be absorbed.

To overcome this drawback, the British Patent No. 2,247,652 suggests providing tear-off strips limited by a row of elongate slots. However, with such a limitation of tear-off strips, a continuous energy absorption is not possible, but only a repeated jerky absorption. Therefore, it should be insured that at least the tear-off strips are torn off along tear-off lines. But generally, the fissures run at an angle in a totally uncontrollable manner toward the longitudinal axis of the tube in the tube material. This possibly results from the structure of the tube material. Usually, the tube material has a cubic body-centered lattice structure, and the fissures extend along glide lines or glide planes of the lattice structure. This is probably why the above-described construction did not find a practical application. Probably, because it was not sufficiently repeatable. For a safety element, this was an inadequate property.

Accordingly, an object of the invention is a steering shaft of the first type which, in case of a collision, upon the impact force reaching a predetermined value, could be shortened in a controllable continuous manner.

SUMMARY OF THE INVENTION

This and other objects of the present invention, which will become apparent hereinafter, are achieved by providing a steering shaft including an outer tubular member, and an inner member extending into the outer member and secured therein against axial and/or radial displacement relative to the outer member, with the two members axially being displaceable relative to each other in case of a collision, and with one of the tubular members, having tear-of strips with bent-over, front ends having bent-over sections engaging the other members, with each of the tear-off strips being formed each by two spaced flutes defining weakness locations.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 is a partial longitudinal cross-sectional view of a first embodiment of a steering column showing elements essential for the present invention;

FIG. 2 is a cross-sectional view along line II—II in FIG. 1;

FIG. 3 is a view in the direction of arrow "A" in FIG. 1;

FIG. 4 is a partial view of an embodiment of the present invention showing tear-off strips on the tubular member;

FIG. 5 is partial longitudinal cross-sectional view of a second embodiment of a steering column showing elements essential for the present invention;

FIG. 6 is a cross-sectional view along line VI—VI in FIG. 5;

DETAILED DESCRIPTION OF THE PREFERRED EMBODIMENTS

Figure 7:
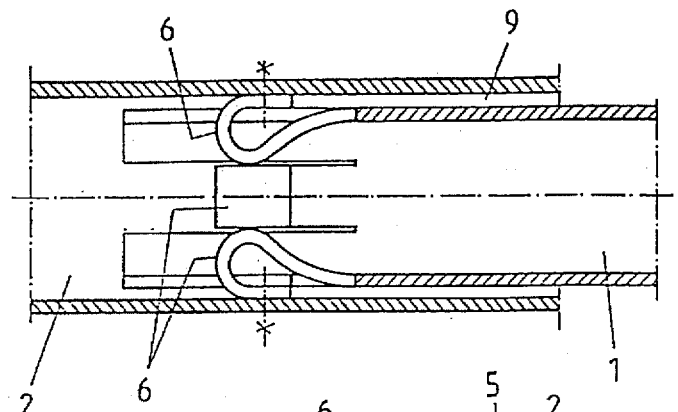
FIG. 7 is a cross-sectional view of a third embodiment of a steering column showing elements essential for the present invention.

The steering shaft according to the present invention, which is shown in FIG. 1, includes two members 1 and 2, of which one member 1 is formed as a rod having a circular cross-section, and the other member 2 is formed as a tubular member at the outer end of which (not shown) shaped parts, conventional for a steering column, are provided, which shaped parts, as not directly relating to the present invention, are not shown here. In this connection, reference can be made to relevant prior art references listed in the preamble of the specification. The penetration depth of the member 1 into the member 2 defines the member overlap "U". The member 2, which is formed as a tubular member, includes a plurality of flutes 3 extending along its circumference parallel to the steering column axis. The flutes 3 are formed by any suitable manufacturing process, e.g., by milling, cutting, embossing or the like. These flutes 3, which extend from an end surface 4 of the member 2, limit tear-off strips 5 which, at the end side 4, are cut or stamped free. In the embodiment shown (see FIG. 2), four tear-off strips are provided. The free-cut or free-stamped sections 6 of strips 5 are U-bent inward and abut the other profile 1. The flutes 3 form weakness locations of the member 2. When an axial force acts on a steering column, which is shown in FIG. 1, as it takes place in case of a collision, as soon as the axial force reaches a predetermined value, the member 2 is pushed backward, in the direction of arrow 7, relative to the member 1, as if being shortened, whereby the tear-off strips 5 are torn off and unrolled. The magnitude of the required force is adjustable in a very wide range by changing the shape and the thickness of the flutes 3 and by using an appropriate process for forming them (milling, cutting, pressing, embossing and the like), and further by changing the course of the flutes along the profile 2. The flutes can extend parallel to each other so that the tear-off strips 5 which have the same width along their length. The flutes 3, however, can so extend that the tear-off strips 5 have an increased width along their length, as shown in FIG. 4. While the flutes 3 in the example shown in FIG. 4 are rectilinear, it is also possible to so arrange them that they extend along a bent course.

In the embodiment shown in FIG. 1, the member overlap "U" of the members 1 and 2 is relatively short. It is within the scope of the invention to provide a larger member overlap "U" and to provide, in the region of such an increased member overlap, several cross-sectional planes in which the members 1 and 2 are connected in a manner shown in FIG. 1. In this case, along the longitudinal extent of the member 2, which is formed as a tubular member, there will be provided several groups of free-cut or free-stamped sections 6 of the tear-off strips 5, spaced from each other. It is also contemplated, according to the invention, to provide, along the entire circumference of the member 2, formed as a tubular member, flutes 3 which are spaced from each other by the same arcuate distance, so that the tear-off strips 5 are located one next to another and form annular free-cut or free-stamped sections 6 which are axially offset relative to each other. Thereby, in the member overlap region, there are formed several weakness locations such, as discussed above with reference to FIG. 1. Providing several weakness locations are also contemplated for the below described other embodiments of a steering shaft according to the present invention, without further reference thereto during the description of the other embodiments.

FIGS. 5 and 6 show an embodiment of a steering shaft according to the present invention, in which the members 1 and 2 are formed as tubular members having a rectangular cross-section. In this embodiment, it is the inner member 1, which is provided with the tear-off strips 5 limited by the flutes 3. In the outer member 1, there are provided a plurality of recesses 8 through which the U-shaped annular sections 6 of the tear-off strips 5 extend. The outer ends of the strip sections 6 engage the outer profile 2. By this construction the annular gap 9 between the two members 1 and 2 can be made relatively small. In order not to obstruct the unrolling of the torn tear-off strips 5 in case of a collision, the ends 10 of the recesses 8, which are remote from the end surface 4 of the member 1, can be bent outwardly to form, respectively, conical or wedge-shaped run-up surfaces or ramps for the unrolled tear-off strips during a collision.

Another construction of a steering shaft with a small annular gap 9 between the two members 1 and 2 is shown in FIG. 7. In FIG. 7, the bent-over sections 6 are hook-shaped. The width of the annular gap 9 should not be smaller than the thickness of the member in which the tear-off strips are formed so that, when a collision takes place, the unrolled tear-off strips 5 could be received in the annular gap 9. If the annular gap 9 is too narrow then, in case of a collision, the outer member would expand as a result of unrolling of the tear-off strips. This would lead to generation of forces, which would be difficult to control, and would require providing in the outer member, in each region in which the two members are displaced relative to each other, special measures for controlling the expansion of the outer profile. This measure may consist, e.g., in providing in the outer member longitudinally extending recesses or notches.

Figure 8:
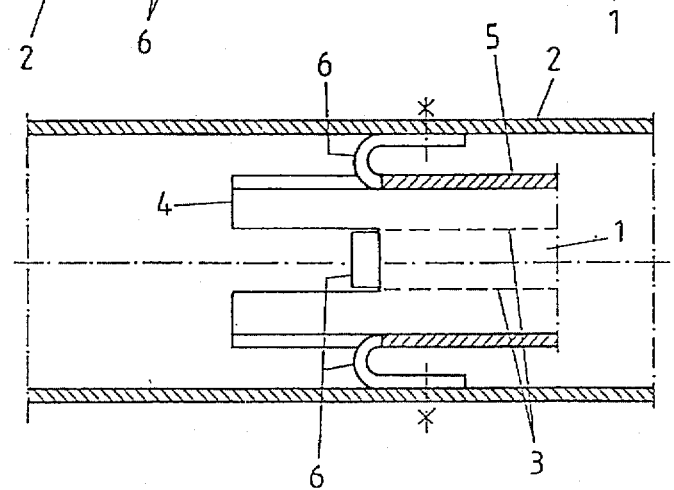
FIG. 8 is a cross-sectional view of a fourth embodiment of a steering column showing elements essential for the present invention.
Figure 9:
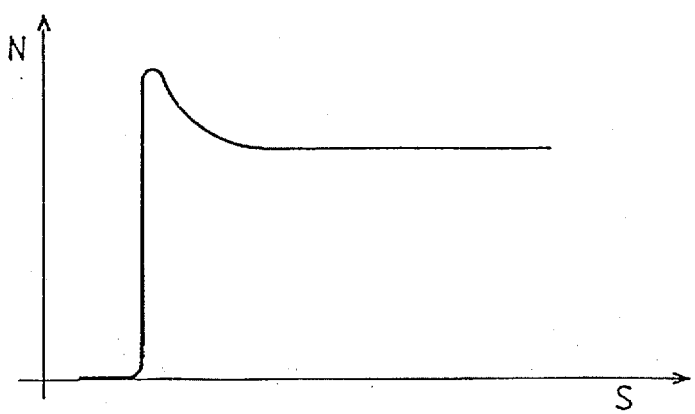
FIG. 9 is a force-path diagram

An especially advantageous construction of a steering shaft according to the present invention is shown in FIG. 8, where the members 1 and 2 can be formed as tubular members having a circular or polygonal cross-section. In the embodiment shown in FIG. 8, the ring or annular gap 9 is formed rather large so that, in case of a collision, the tear-off strips 5 can unroll without any hindrance. This favorably influences the desired force characteristic. This force characteristic is shown in FIG. 9 which represents a force-path diagram. In case of a collision, a sudden relatively large force N acts on a steering shaft which acts along the flutes 3 tearing off the strips 5 and, simultaneously, deforms them by displacing the members 1 and 2 relative to each other.

In the embodiments shown, the members 1 and 2 are coaxial having the same axis. It is also contemplated, according to the present invention, to provide steering shafts in which the members 1 and 2 are not coaxial, e.g., when one of the member has a portion of its circumference located closer to another member, with the tear-off strips being provided in a region remote from the region in which the members 1 and 2 approach each other.

In all of the embodiments shown, the tear-off strips 5 are limited by flutes 3, which form continuous points of weakness, and form part of a respective member 1 or 2.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A steering shaft for a steering system of a motor vehicle, comprising:
   a first tubular member; and
   a second tubular member extending into the first tubular member and secured therein without a possibility of axial and radial displacement relative thereto during normal operation of the steering shaft,
   wherein the first and second tubular members are displaceable relative to each other in an axial direction in case of a collision, wherein the second tubular member has a plurality of tear-off strips each having a bent-over front end, when viewed in a displacement direction of the first and second tubular members, which is one of cut free and stamped free of the second tubular member, wherein the second tubular member has a plurality of pairs of flutes continuously extending along the second tubular member, with each pair of flutes forming one of the tear-off strips and defining weakness locations, wherein the first tubular member has a plurality of recesses corresponding to the plurality of tear-off strips, and wherein the bent-over front ends of the tear-off strips project through respective recesses of the first tubular member and engage the first tubular member.

2. A steering shaft as set forth in claim 1, wherein a distance between each pair of flutes varies along a longitudinal extent thereof.

3. A steering shaft as set forth in claim 1, wherein a width of an annular gap between the first and second tubular members corresponds to a thickness of the tubular members and wherein the bent-over ends are hook-shaped, with bent-over end sections thereof extending across the annular gap.

* * * * *